Sept. 20, 1960 L. M. CARVER 2,953,641
REGENERATIVE REPEATER SYSTEM
Filed July 22, 1959 7 Sheets-Sheet 1

INVENTOR.
Lawrence M. Carver
BY
ATTORNEY

Sept. 20, 1960 L. M. CARVER 2,953,641
REGENERATIVE REPEATER SYSTEM
Filed July 22, 1959 7 Sheets-Sheet 2
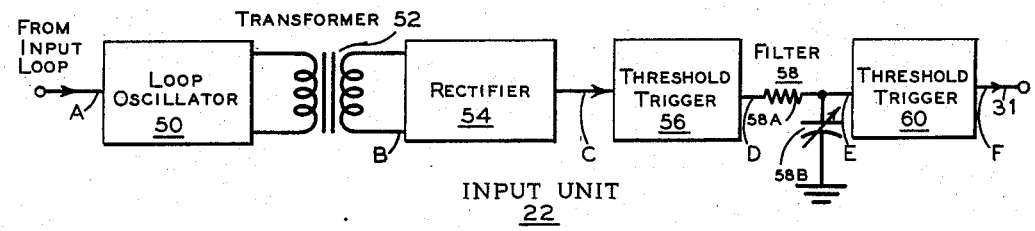
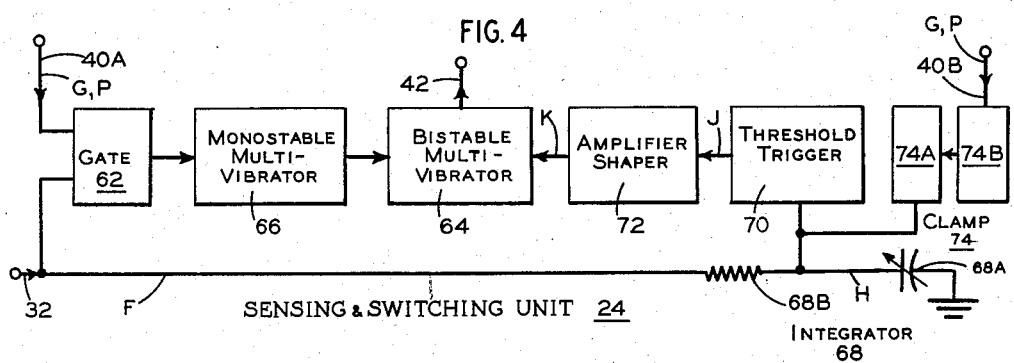
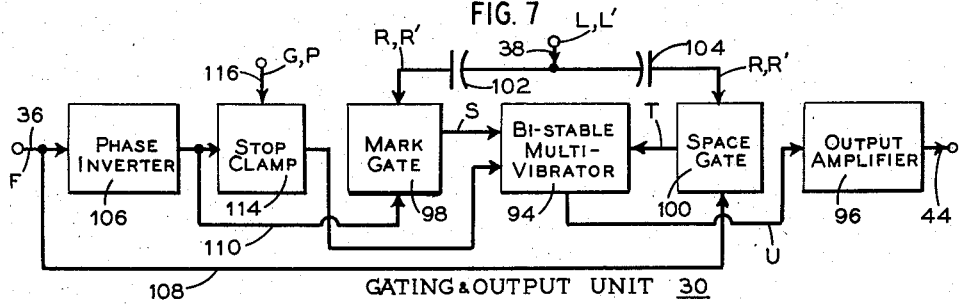
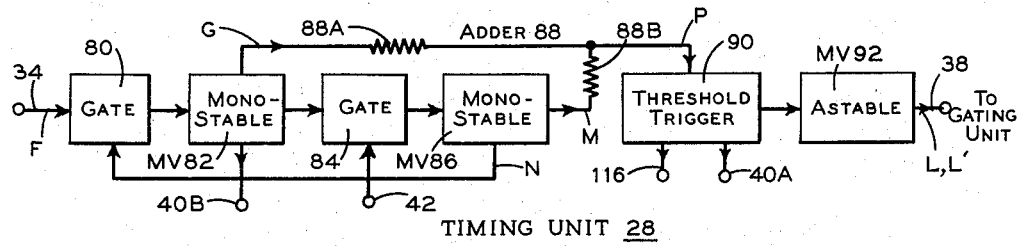
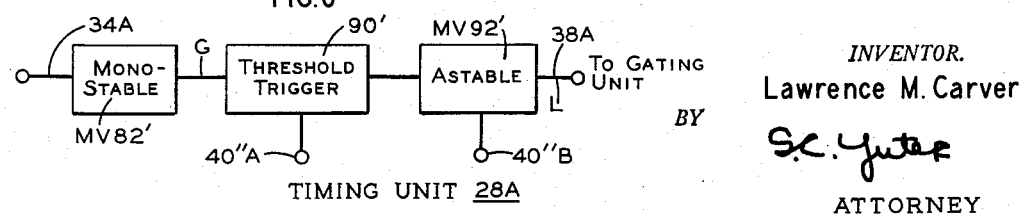
INVENTOR.
Lawrence M. Carver
BY
ATTORNEY Sept. 20, 1960          L. M. CARVER          2,953,641

REGENERATIVE REPEATER SYSTEM

Filed July 22, 1959          7 Sheets-Sheet 3

INVENTOR.
Lawrence M. Carver
BY
ATTORNEY

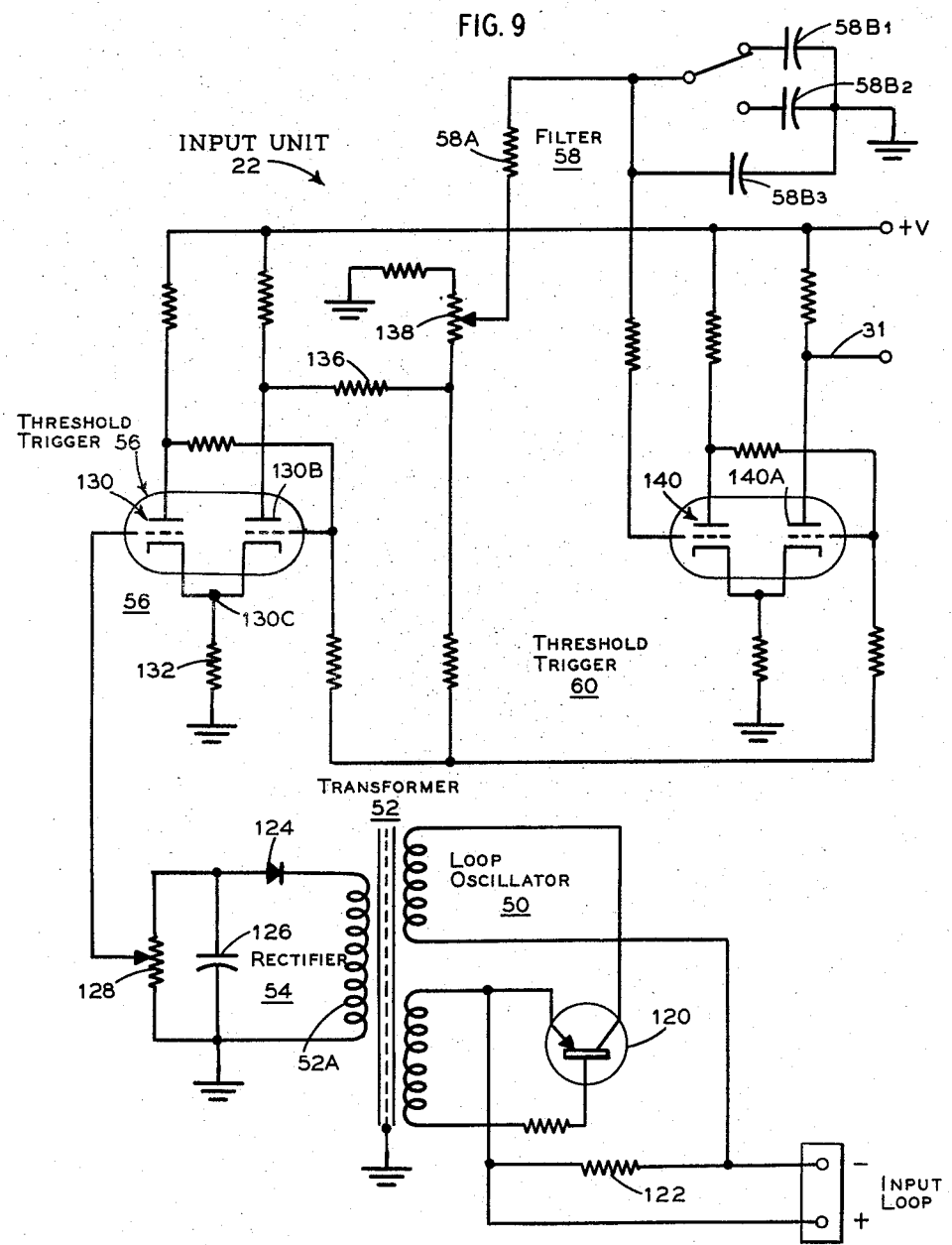

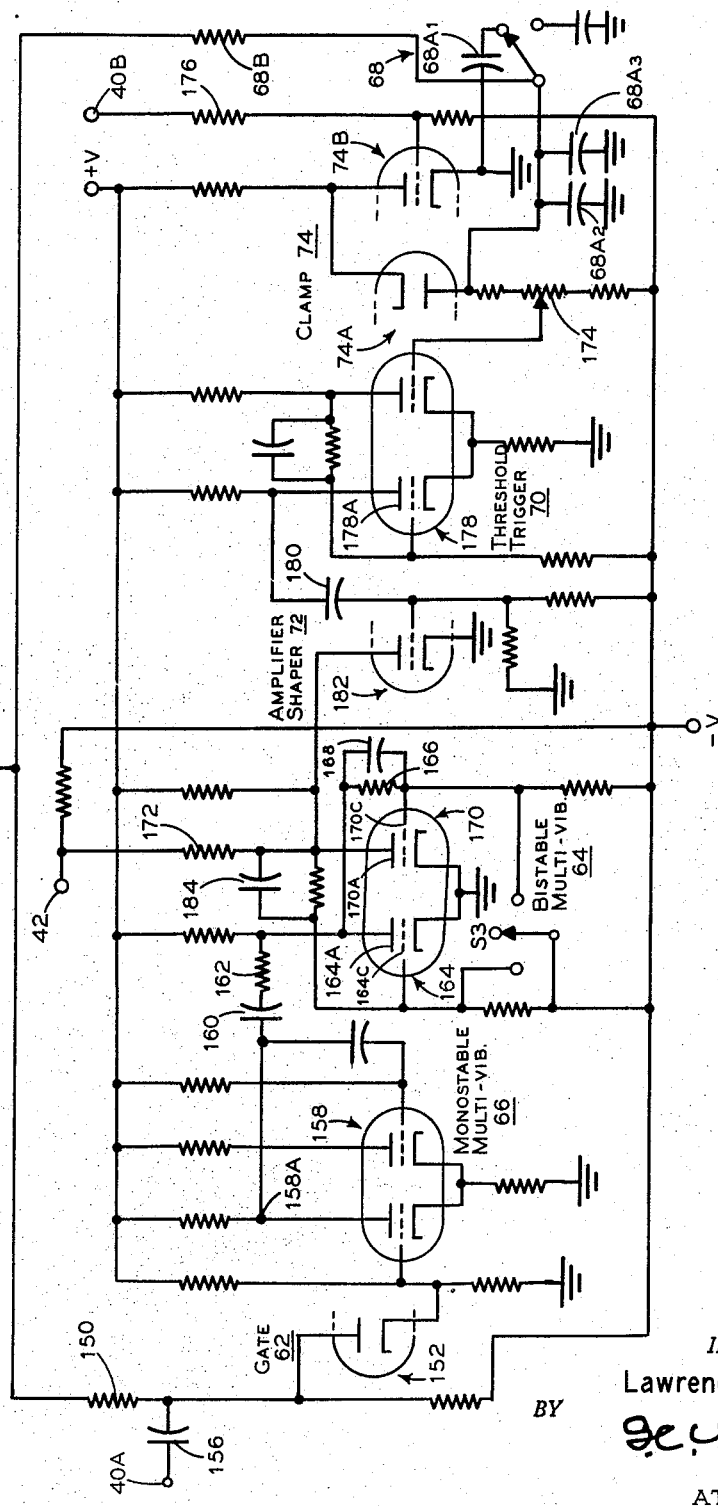

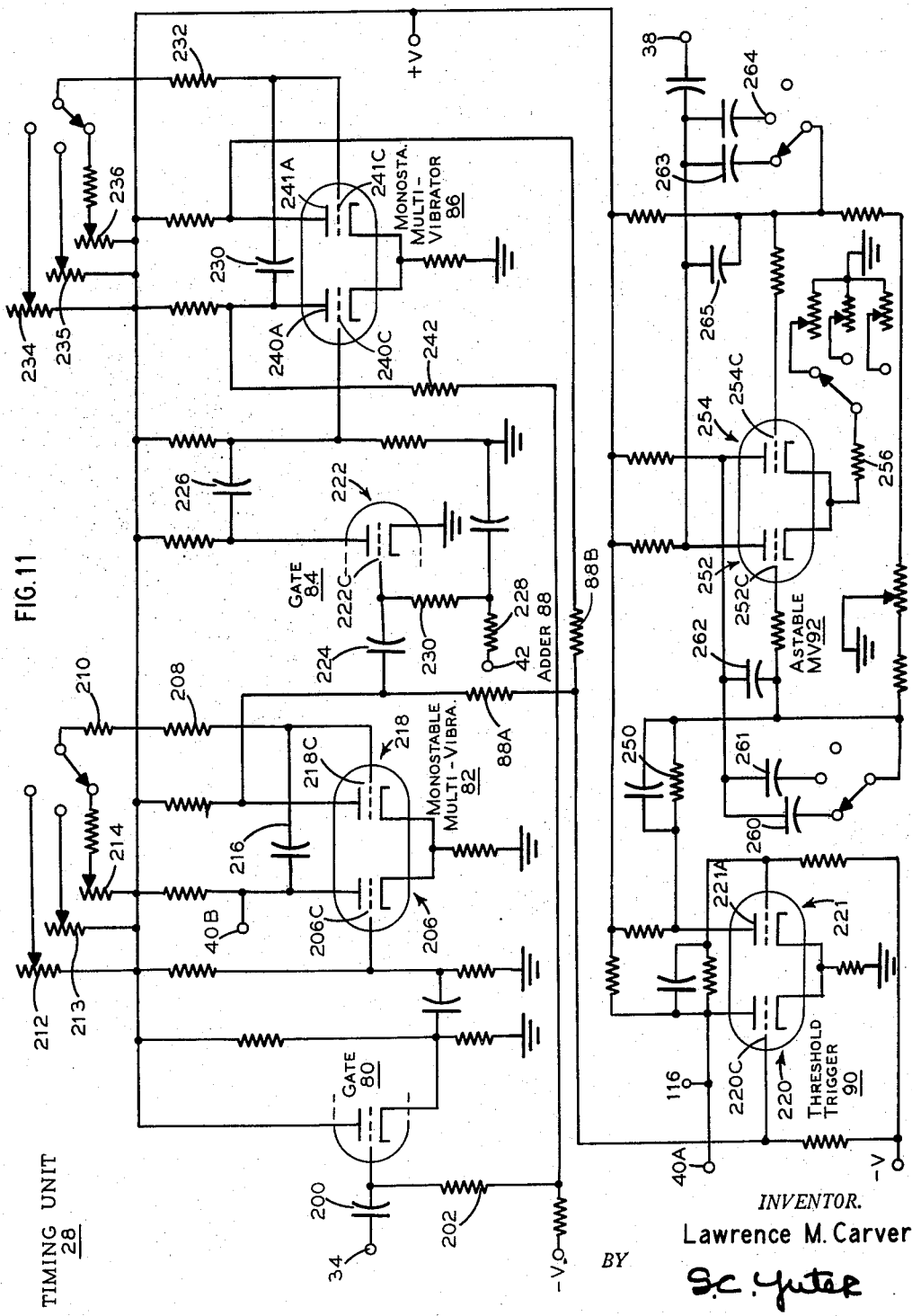

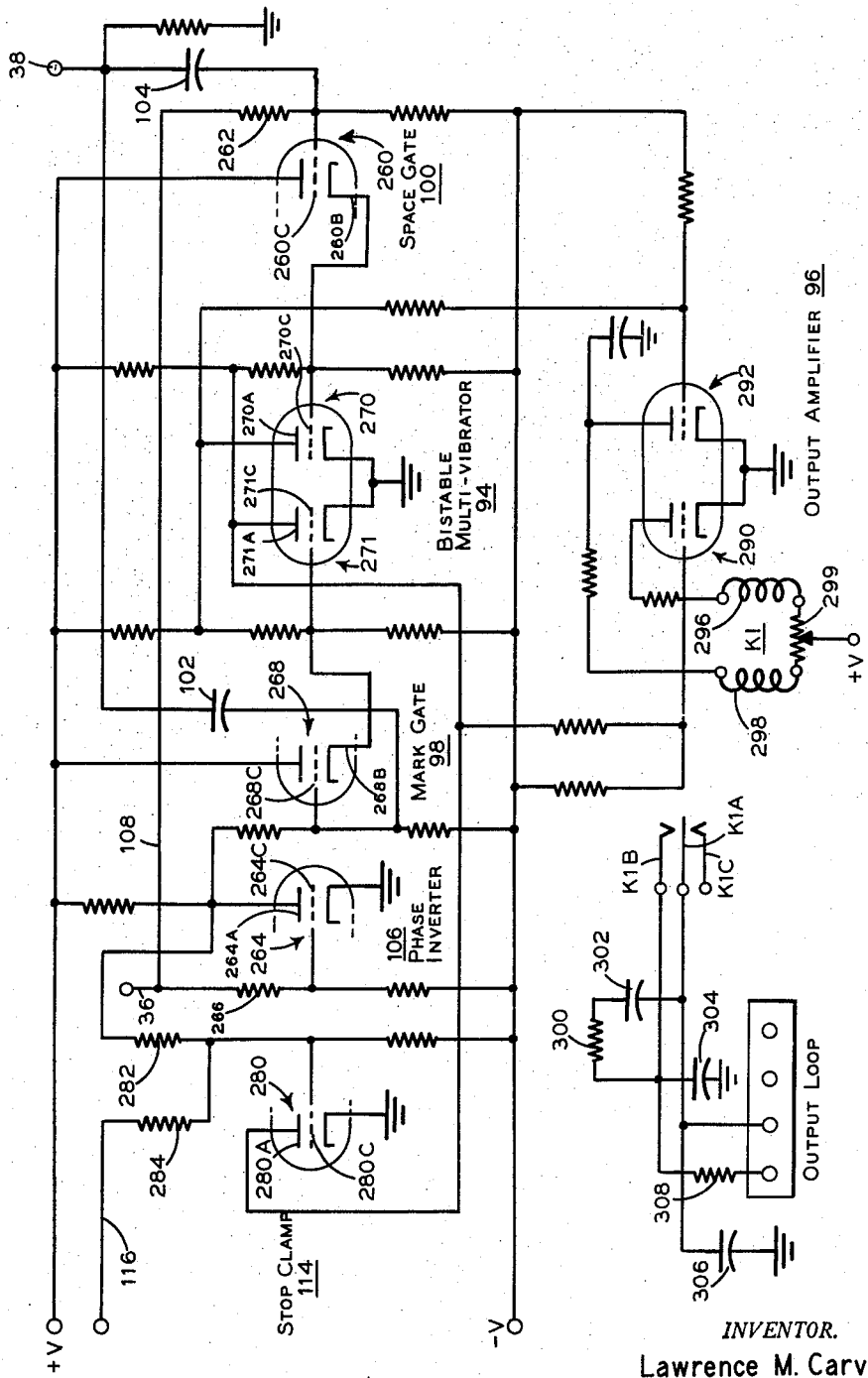

United States Patent Office 2,953,641
Patented Sept. 20, 1960

2,953,641
REGENERATIVE REPEATER SYSTEM

Lawrence M. Carver, Springdale, Conn., assignor to Stelma, Incorporated, Stamford, Conn., a corporation of Connecticut Filed July 22, 1959, Ser. No. 828,899

22 Claims. (Cl. 178—70)

This invention pertains to communication equipment and more particularly to regenerative repeater systems.

One of the most common means for transmitting information between remote locations is to represent the information as coded combinations of electrical signals or pulses. These pulses are then transmitted either through space or along wires to a receiving station.

In general, when wire transmission is employed, the link between the sending station and the receiving station is known as a communication loop. As the length of the loop increases, the pulses become distorted or misshapen and decrease in amplitude, and gradually lose their usefulness as information. In order to permit the transmission of information over exceedingly great distances, apparatus known as repeaters are serially interposed in the communication loop at strategic positions. These repeaters are devices which accept the misshapen and attenuated pulses and restore them to their original shape and amplitudes by generating new pulses to replace the old ones. In other words, the pulses are regenerated; the process of restoring their shape and amplitude has become known as regeneration.

Regenerative repeaters have been employed for a long time in the telegraph art. Their operation depends upon the code employed to represent the units of information such as characters. For example, in conventional telegraph operations, a Baudot code is employed. Each character, alphabetical, numerical, or other, is represented by a time sequence of pulses comprising a start position, five information positions, and a stop position. The start position is always represented by a space or no-pulse condition; the stop position is always represented by a mark or pulse condition. The intervening five positions are some combination of marks and spaces (pulses and no-pulses) which represent the character being transmitted. The coded combinations of pulses and spaces in the five intermediate positions permit representation of thirty-one characters, sufficient to represent all of the characters on a conventional teleprinter. It should be noted that the five information positions may be called bit or binary digit positions.

The system is further identified as a start-stop system because the start and stop positions control the utilization of each character. For example, in conventional regenerative telegraphic repeaters, the transition from the stop position to the start position of the next character causes the repeater to generate a plurality of sampling pulses which are used to regenerate the signals (pulses) associated with the character being received. In particular, in a telegraph link which employs the five unit (bit) or Baudot code, the repeaters generate seven sampling pulses for each character received. Therefore, when the system was intially built to handle five unit code, it could only handle five-unit code.

In recent years, however, the need has arisen to transmit characters which require more than five information positions for their representation. For example, communication loops have been set up to interconnect remotely located processing equipment, which require an eight unit (bit) code; i.e., each character of information is represented by ten positions, a start position, eight information positions, and a stop position. Since conventional teleprinter repeaters have been designed to handle only five-unit code, the eight-unit code cannot be transmitted over the available teleprinter communication loops. Therefore, independent communication loops have been set up which incorporate repeaters that can handle the eight-unit code. These repeaters operate with the same principle as the repeaters handling five-unit code, but they generate ten sampling pulses per character received and therefore cannot handle the five-unit code.

Accordingly, it has been necessary heretofore to employ two communication loops between installations which have both teleprinters and data processors where separate regenerative repeaters were used. Such a system entails essentially a complete duplication of equipment which, therefore, doubles the cost of a communication loop and further doubles the maintenance required.

It is a general object of the invention to provide an improved regenerative repeater for a communications loop.

It is another object of the invention to provide improved coupling means between installations having data handling equipment which employ two different codes.

It is a further object of the invention to provide an improved regenerative repeater which can regenerate the information signals associated with characters of information which are represented in either one of two different code systems.

In accordance with one embodiment of the invention, apparatus is provided for incorporation in a communications loop. The loop transfers information as information signals. Each character of the information signals is represented by a coded combination group of a first number of signals, for example, five-unit code or a coded combination group of a second number of signals, for example, eight-unit code. The apparatus is a repeater comprising sensing means for sensing whether the characters of information being transferred are represented by coded combination groups of the first or second number of signals and a regenerating means responsive to the sensing means and the information signals. The regenerating means transmits regenerated information signals in groups of the first or second numbers of signals in accordance with the coded combination groups sensed by the sensing means.

A feature of the invention is means for the repeater to handle information which is transmitted at different rates. For example, the apparatus can be readily adjusted to handle information being transmitted at, say, sixty, seventy-five or one hundred words per minute.

Other objects, features and advantages of the invention will be evident from the following detailed description when read in connection with the accompanying drawings, wherein:

Fig. 3 is a block diagram of the input unit of Figs. 1 and 2;

Fig. 4 is a block diagram of the sensing and switching unit of Figs. 1 and 2;

Fig. 5 is a block diagram of the timing unit of Fig. 1 and of the timing unit incorporated in the eight-unit code regeneration unit of Fig. 2;

Fig. 6 is a block diagram of the timing unit employed in the five-unit code regeneration unit of Fig. 2;

Fig. 7 shows in block diagram form the gating-output unit of Figs. 1 and 2;

Fig. 9 is a schematic diagram of the input unit of Fig. 3;

Fig. 10 is a schematic diagram of the sensing and switching unit of Fig. 4;

Fig. 11 shows in schematic form the timing unit of Fig. 5; and

Fig. 12 schematically represents the gating and output unit of Fig. 7.

In order to provide a more complete understanding of the operation of the apparatus of the invention, it will first be necessary to further discuss the format of the information being transmitted.

In general, information is transmitted in blocks; i.e., a plurality of information characters. For example, one block may be a complete message in five-unit code, whereas another block may be a complete message in eight-unit code. At the start of the transmission of a block, a special character in the code to be used is transmitted. This is followed by the characters of information in that code. Thus, for example, if the information to be transmitted is in five-unit code, a special character in five-unit code prefixes the block of information, whereas if the information to be transmitted is in eight-unit code, the special character is in eight-unit code. When choosing these special characters, it is necessary to choose combinations which can occur only in one of the codes and not in the other. For example, to indicate eight-unit code, it is only necessary to choose any pulse combination which does not have a mark or pulse in its seventh position because the seventh position of a character in five-unit code is the stop position. This stop position always contains a mark or pulse. Thus, a character with a space in its seventh position is unique for eight-unit code.

To choose the special character to indicate five-unit code one takes advantage of the fact that no character in eight-unit code has five spaces in its first five information positions. The blank character in five-unit code has spaces in its five information positions; therefore, this is the special character for five-unit code. Thus, whenever a five-unit code blank character is transmitted it is known that the succeeding units of information are in five-unit code.

Figure 1:
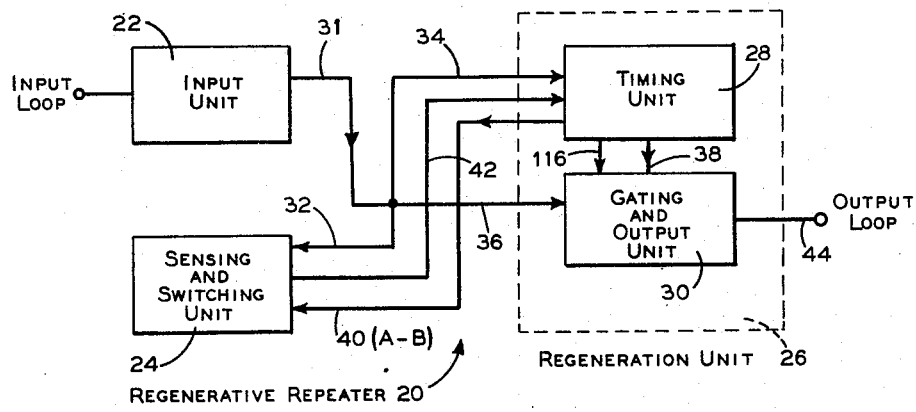
Fig. 1 is a block diagram of a repeater in accordance with one embodiment of the invention.

Referring now to Fig. 1, a regenerative repeater 20 (according to one embodiment of the invention) is shown comprising an input unit 22 which receives information signals from an input loop, a sensing and switching unit 24, and a regeneration unit 26 which includes a timing unit 28, and a gating and output unit 30 for transmitting regenerated information signals to the output loop of a communications loop.

The input unit 22, hereinafter more fully described, receives the raw information signals from the input loop and performs a filtering operation to remove any possible transients in the signals. The sensing and switching unit 24, containing a bistable device hereinafter more fully described, senses for the special characters which precede the blocks of information. When the sensing and switching unit 24 detects the special character associated with five-unit code, the bistable device assumes a first stable state. When the sensing and switching unit 24 detects the special character associated with eight-unit code, the bistable device assumes a second stable state. These stable states control the operation of the timing unit 28.

Timing unit 28 is primarily a pulse generator which generates a plurality of sampling pulses for each character received. The number of sampling pulses generated depends on the state of the bistable device in sensing and switching unit 24. These sample pulses are fed to the gating and output unit 30.

The gating and output unit 30 receives the sampling pulses and the information signals from the input unit 22 and, by a gating and toggle operation, transmits regenerated information signals.

More particularly, the information signals are received by the input unit 22 and, after filtering therein, are fed via the lines 31 and 32 to the sensing and switching unit 24, via the lines 31 and 34 to the timing unit 28, and via the lines 31 and 36 to the gating and output unit 30. The first signal of the character, more specifically, the transition from the stop mark to the start space, activates the timing unit 28 which starts transmitting sampling pulses via a line 38 to the gating and output unit 30 to sample the information signals it receives from input unit 22.

At the same time, the information signals are sensed by the sensing and switching unit 24 and a sampling is performed when the sixth information position in the unit of information is received. The time of the sampling is controlled by signals received from the timing unit 28 via the lines 40A and 40B. If the character is not a special character, then the bistable device in the sensing and switching unit 24 does not change state. If the character is a special character but indicates that the block of information is in the same code as the previously received block, the bistable device also does not change state. However, if the special character indicates that the block of information is in the alternate code, then the bistable device does change state.

The state of the bistable device determines the polarity of a signal fed from the sensing and switching unit 24 via the line 42 to the timing unit 28. If the bistable device is in the state indicating that eight-unit code is being received, then the timing unit 28 generates an additional group of pulses so that ten instead of seven sampling pulses are fed to the gating and output unit 30. These sampling pulses probe the information signals fed to the gating and output unit 30 to cause the transmission of regenerated information signals via the line 44 to the output loop.

Figure 2:
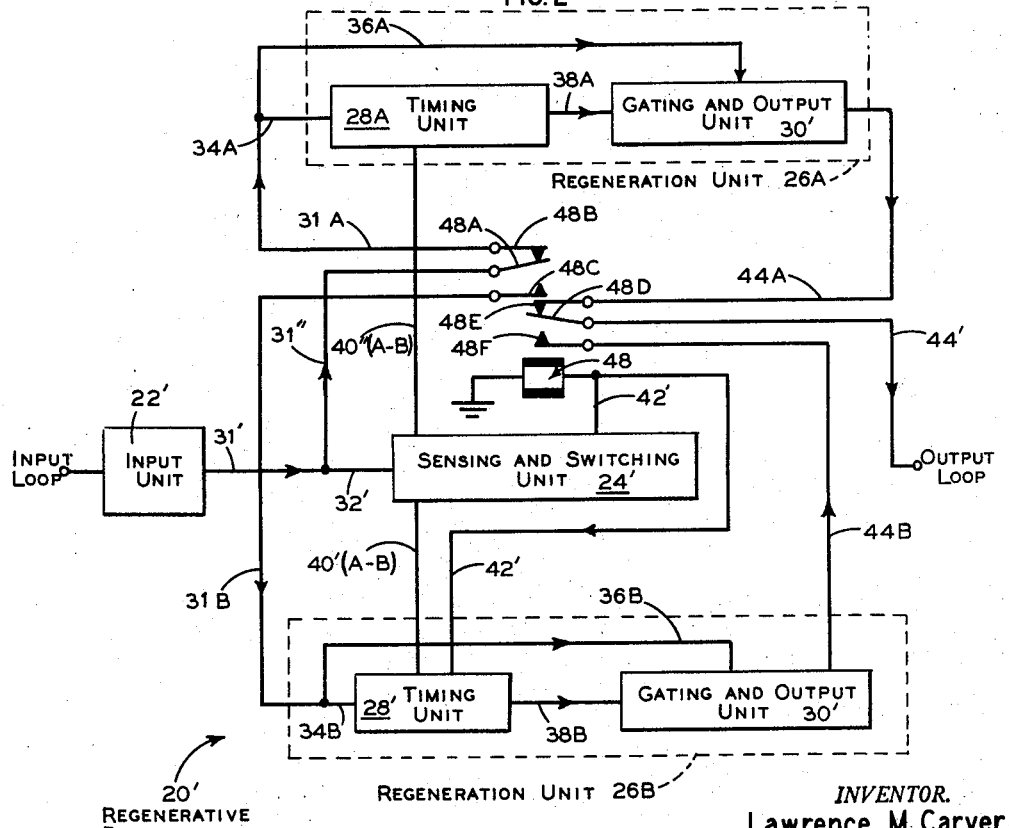
Fig. 2 is a block diagram of another repeater in accordance with a second embodiment of the invention.

An alternative embodiment of the invention is shown in Fig. 2 for the regenerative repeater 20'. Since many of the units of the regenerative repeater 20' are identical to the units of Fig. 1, primed reference characters will be employed for like units and only the differences will be pointed out.

Basically, the signals representing the characters are received by the input unit 22' and are fed either to a regeneration unit 26A or a regeneration unit 26B through the agency of a relay 48 under the control of the sensing and switching unit 24'. If the received characters are in the five-unit code, the bistable device in the sensing and switching unit 24' is in a first stable state which does not energize the relay 48, and the information signals are fed via the line 31', the line 31" to the moving contact 48A, to the fixed contact 48B, to the line 31A, to the regeneration unit 26A. Regenerated information signals are transmitted from the gating and output unit 30' via the line 44A, the fixed contact 48E, the moving contact 48D, to the line 44'.

On the other hand, if the received characters are in the eight-unit code, the bistable device in the sensing and switching unit 24' is in the second stable state and the relay 48 is energized. Thus, the information signals are fed via the line 31', the line 31", to the moving contact 48A, the fixed contact 48C and the line 31B to the regeneration unit 26B. The regenerated information signals are fed from the gating and output unit 30' via the line 44B, the fixed contact 48F, the moving contact 48D to the line 44'.

The sensing and switching unit 24' is identical to the sensing and switching unit 24 of Fig. 1; it senses the special characters at the start of the blocks to control the stable state of the bistable device. The regeneration unit 26B is identical to the regeneration unit 26 of Fig. 1 and, in particular, the timing unit 28' will always generate ten sampling pulses whenever information signals are being received via the line 34B. On the other hand, the regeneration unit 26A is slightly different from the regeneration unit 26 of Fig. 1. Its gating and output unit 30′ is identical to the gating and output unit 30; however, its timing unit 28A will only generate seven sampling pulses whenever it is activated, whereas the timing unit 28 will generate either seven or ten sampling pulses, dependent upon the state of the bistable device in the sensing and switching unit 24.

Thus, it is seen that the regenerative repeater 20′ can be advantageously used when a conventional repeater is incorporated in a communications link. It is only necessary to incorporate a sensing and switching unit 24′ and an additional regeneration unit to handle the characters in the second code.

Referring now to Fig. 3, the input unit 22 is shown comprising the loop oscillator 50, the transformer 52, the rectifier 54, the threshold trigger 56, the filter 58 and the threshold trigger 60 serially disposed in the same order between the input loop and the line 31. By employing the loop oscillator 50 and the transformer 52, there is provided direct current isolation between the input loop and the remainder of the circuits of the regenerative repeater 20. Thus, whatever direct current potential the input loop may be at, such direct current potential does not affect the regenerative repeater circuits.

The operation of the input unit 22 will now be described with the aid of the waveforms shown in Fig. 8. Information signals from the input loop, waveform A, are received by loop oscillator 50 which generates start-stop oscillations that are fed via transformer 52 as signals shown in waveform B to rectifier 54. After rectification and filtering, the signals (waveform C) are transmitted to threshold trigger 56 (a conventional Schmitt trigger) which produces a squared up and inverted replica of the input signals, waveform D. These signals are filtered by the intergrating circuit comprising the resistor 58A and capacitor 58B to produce the waveform E that is fed to threshold trigger 60. The output of filter 58 as waveform E is again squared up by the threshold trigger 60 to produce the waveform F that is transmitted via line 31 to the remaining circuits of the regenerative repeater 20. The threshold voltage of the threshold trigger 60 and the time constant of the filter 58 are chosen so that a signal from the filter 58 must persist for at least one quarter of a baud or pulse time before the threshold trigger 60 is activated. Therefore, noise pulses or holes (transients) in the input loop which have duration of less than a quarter of a pulse time or baud, cannot be passed.

The capacitor 58B is variable so that if the repetition rate of the received information signals is changed, then by changing the value of the capacitor 58B, a new time constant is obtained which will still cause reliable triggering of the threshold trigger 60. It should be noted that the signals transmitted from the threshold trigger 60 of the input unit 22, to the sensing and switching unit 24 and the regeneration unit 26, are replicas of the information signals from the input loop except that all transients have been removed, and that the signals are inverted and delayed by approximately one quarter of a pulse time or baud.

The sensing and switching unit 24 is shown in Fig. 4. It comprises a gate 62 which feeds one input of a bistable multivibrator 64 via a mono-stable multivibrator 66. The second input of the bistable multivibrator 64 receives signals from an integrator 68 via a threshold trigger 70 and an amplifier shaper 72. A clamp 74A and 74B that is coupled to the output of the integrator 68, controls the starting voltage of the integrator operation.

When the bistable multivibrator 64 is in a first stable state, the signal transmitted from its output via the line 42 to the timing unit 28 has a negative value, and the regenerative repeater 20 is conditioned to handle five-unit code. When the bistable multivibrator 64 is in its second stable state, the signal on the line 42 is positive and the regenerative repeater 20 is conditioned to handle eight-unit code.

The switching of bistable multivibrator 64 will now be described. First, assume that the regenerative repeater 20 is conditioned to receive five-unit code. The bistable multivibrator 64 is therefore in its first stable state and transmitting a negative voltage along the line 42. Any character having a space (no pulse) in its seventh position is the special character at the start of a block of information which indicates that the succeeding characters are to be treated as eight-unit code. It is therefore necessary for the sensing and switching unit 24 to sense this special character and trigger the bistable multivibrator 64 to its second stable state. The waveform of this special character, as an inverted output of the input unit 22, is shown as F′ in Fig. 8. This waveform is fed from the input unit 22 (Fig. 1) via the lines 31 and 32 to the gate 62 and to the integrator 68 of the sensing and switching unit 24. During the reception of each character, the timing unit (Fig. 1) feeds a signal shown in waveform G to the gate 62 via the line 40A, and to the clamp 74 via the line 40B. In particular, the gate 62 is sensitive to negative-going transitions of the waveform G. This transition always occurs at the start of the seventh position in a character. If, at this time, a space is transmitted from the input unit 22 via the line 32 to the gate 62, a pulse triggers the monostable multivibrator 66. The monostable multivibrator 66 generates a pulse which causes the bistable multivibrator 64 to assume its second stable state and to transmit a positive voltage on the line 42. The regenerative repeater 20 is now conditioned for handling eight-unit code.

It should be noted that as long as characters in five-unit code are being received by the regenerative repeater 20, the signals on the line 32 will have the stop mark pulse in their seventh position and no pulse will be passed by the gate 62.

Now, assume that the regenerative repeater 20 is conditioned for receiving eight-unit code and the special character indicating that the succeeding units of information are in five-unit code is received by the input unit 22. It should be recalled that the special character is a blank character represented by five spaces in its five information positions. Accordingly, the character as sensed will have six spaces and then a mark, the first space being the conventional start space indicating the start of the character. The blank character is shown in waveform F″ in Fig. 8, after inversion by the input unit 22. The signal representation is received from the lines 32 and fed to the gate 62 and the integrator 68. The capacitor 68A charges via the resistor 68B and the charging voltage is shown by the waveform H. The line 76 in waveform H indicates the threshold voltage at which the threshold trigger 70 operates causing the generation of the pulse shown in waveform J, which is transmitted to amplifier shaper 72 for inversion and differentiation as shown in waveform K.

The inverted differentiated pulse triggers the bistable multivibrator 64 to its first stable state causing the voltage on the line 42 to go negative. The regenerative repeater 20 is now conditioned for five-unit code. The function of the clamp which comprises the circuits 74A and 74B is to discharge the capacitor 68A to the same starting voltage at the end of each cycle so that the capacitor 68A always starts charging from the same voltage level.

It should be noted that if the integrator 68 receives anything but a blank character, the capacitor 68A can never charge to a voltage sufficiently great to trigger the threshold trigger 70.

It should be also noted that if the input signals received by the regenerative repeater 20 go from mark to steady space due to faulty operating procedure, or because of a defective input loop, there will be a simulation of 6 spaces in a row and the sensing and switching unit 24 will switch to five unit code in the sixth information position. However, because there will also be a space in the seventh information position, the sensing and switching unit 24 will immediately return to the condition for receiving eight-unit code.

It should be further noted that the capacitor 68A is a capacitor which may be ganged with the capacitor 58B of the input unit 22 (Fig. 3) and which may be changed to accommodate different repetition rates of the received information signals.

Figure 5 shows the timing unit 28 whose purpose is to supply sampling pulses during the center of each information position. The timing unit 28 comprises the serially disposed gate 80, the monostable multivibrator 82, the gate 84, the monostable multivibrator 86, the adder 88, the threshold trigger 90, and the astable multivibrator 92. Information signals are received via line 34 and line 31 from the input unit 22 (Fig. 1) and sampling pulses are fed from astable multivibrator 92 via the line 38 to the gating and output unit 30. The number of sampling pulses generated per character is controlled by the polarity of the potential received by the gate 84 from the sensing and switching unit 24 via the line 42. The sensing time for sensing the special characters in the sensing and switching unit 24 is controlled by the signals from the threshold trigger 90 fed via line 40A to the sensing and switching unit 24 and the signals from the monostable multivibrator 82 fed via the line 40B to the sensing and switching unit 24 as previously described.

Figure 8:
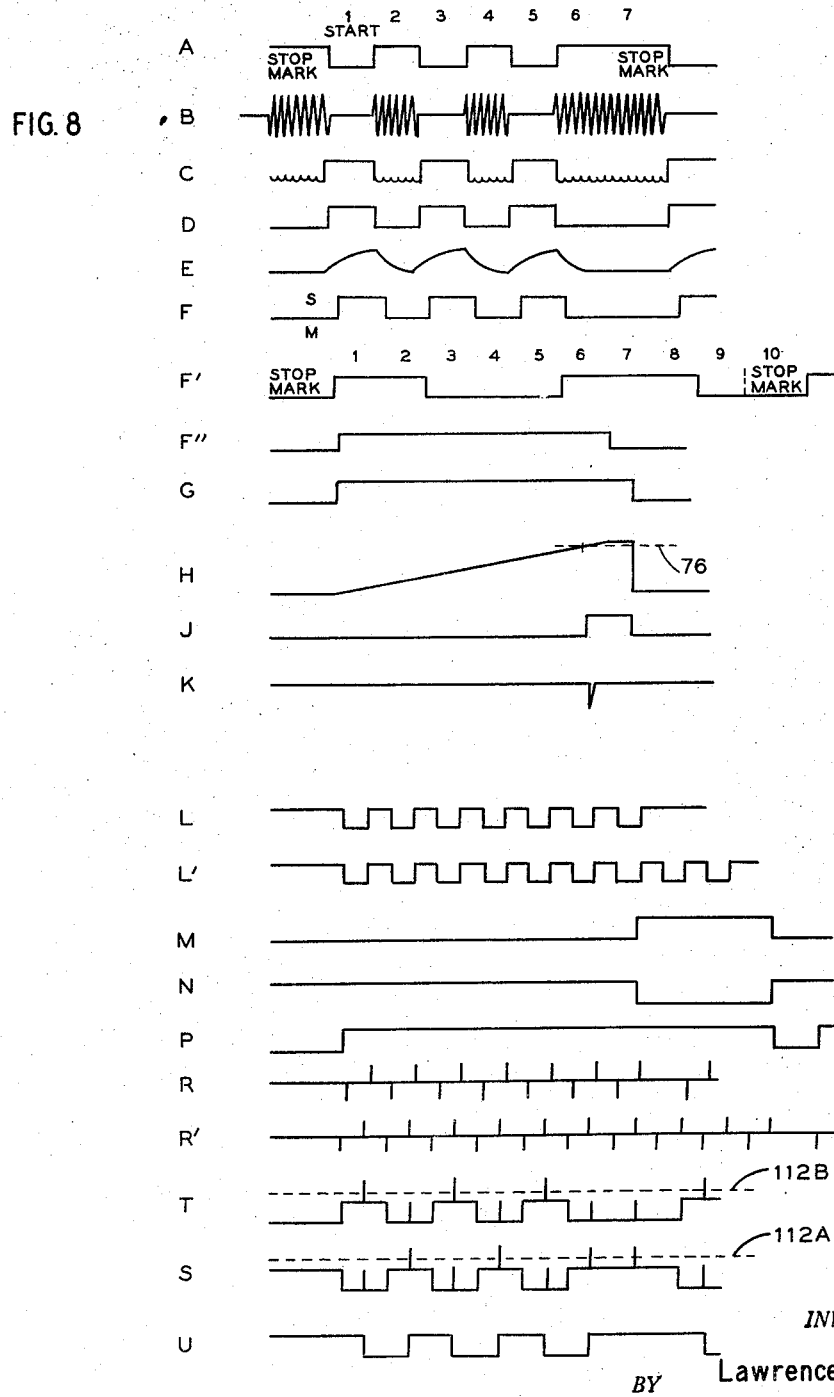
Fig. 8 shows a plurality of waveforms at pertinent points in the apparatus shown in Figs. 3–7.

More particularly, the mark to space transition at the start of the reception of a character, see for example waveform F of Fig. 8, causes a pulse to pass through gate 80 which triggers monostable multivibrator 82, which activates the threshold trigger 90 by a signal fed via resistor 88A of adder 88. The time constant of the monostable multivibrator 82 is adjusted for approximately six and a half baud lengths or pulse positions and the character gate signal transmitted from threshold trigger 90 to the astable multivibrator 92 is of substantially similar duration. See waveform G of Fig. 8. Astable multivibrator 92 accordingly performs six and one half cycles of operation and transmits the parent sampling pulses shown in waveform L of Fig. 8. If five-unit code is being received, nothing further occurs until the next character is transmitted from the input unit 22. However, if the regenerative repeater 20 is conditioned for receiving eight-unit code, the voltage on the line 42 from the sensing and switching unit 24 is positive and the gate 84 is alerted. The transition back to the off state of monostable multivibrator 82 at the end of its cycle (see waveform G) passes through the gate 84 to trigger monostable multivibrator 86, which feeds a signal, waveform M, via resistor 88B to threshold trigger 90. This signal lasts for three pulse positions or baud lengths.

The adder 88 combines the waveforms from the monostable multivibrator 82 and the monostable multivibrator 86 to produce the signal represented by waveform P which determines the period of activation of the threshold trigger 90. When both signals occur sequentially, the signal fed from threshold trigger 90 causes astable multivibrator to generate the nine and one half parent sampling pulses as shown in waveform L' of Fig. 8. At the time when monostable multivibrator 86 is active, it transmits a negative signal to gate 80 (waveform N) which prevents the possible reactivation of monostable multivibrator 82 before the end of the generation of the sampling pulses required to sample a unit of information in eight-unit code. When monostable multivibrator 86 returns to its stable state this negative voltage terminates and the gate 80 is again prepared to pass the next mark to space transition at the start of the reception of a new unit of information. The parent sampling pulses are accordingly fed via line 38 to the gating and output unit 30.

The timing unit 28A as required in Fig. 2 is shown in Fig. 6. Since it is only necessary for this timing unit to generate seven parent sampling pulses, there is no need for the controlled switching to generate either seven or ten parent sampling signals. Accordingly, the timing unit 28A includes only the monostable multivibrator 82', the threshold trigger 90' and the astable multivibrator 92'. The monostable multivibrator 82' is triggered on by the mark-to-space transition at the start of a character received on the line 34A from the contacts of the relay 48 and transmits parent sampling pulses via the line 38A to a gating and output unit 30'. Threshold trigger 90' transmits via line 40"A one timing signal required by the sensing and switching unit 24' and the astable multivibrator 92' transmits the other timing signals via the line 40"B.

Figure 7 shows the gating and output unit 30 whose function is to combine the parent sampling pulses from the timing unit 28 and the information signals from the input unit 22 and to transmit regenerated information signals to the output loop. The gating and output unit 30 comprises a bistable multivibrator 94 which feeds signals to an output amplifier 96 which may drive a relay to transmit signals to the output loop. The bistable multivibrator 94 is triggered from either a mark gate 98 or a space gate 100, which receive both sampling pulses and information signals. The information signals are received from the line 36 and are transmitted to the mark gate 98 via a phase inverter 106, and also directly from the line 36 via a line 108 to the space gate 100. The parent sampling pulses are received via the line 38 from the timing unit 28 and are differentiated by the capacitors 102 and 104 to provide the actual sampling pulses for the mark gate 98 and space gate 100. These actual sampling pulses are shown in waveform R (Fig. 8) for five-unit code and waveform R' for eight-unit code. It should be noted that only the positive spikes are relevant.

The actual operation of the gating and output unit 30 will be described for only a five-unit code, since it operates in the same manner for an eight-unit code.

The combining of the actual sampling pulses and the original information signals to secure the regenerated information signals is accomplished by the mark gate 98 and the space gate 100. The information signals from the input unit 22, waveform F of Figure 8, are fed via the lines 36 and 108 to one input of the space gate 100 and these same signals, except reversed in phase by phase inverter 106, are fed via line 110 to mark gate 98. Both the mark gate 98 and the space gate 100 are "and" gates. The output of the mark gate is shown in waveform S and the output of the space gate 100 is shown in waveform T. In either case, only signals occurring above the conduction levels 112A and 112B of these waveforms can change the state of bistable multivibrator 94 which alternates between stable states to form a distortionless output signal (waveform U, Fig. 8) that is fed to output amplifier 96. The output amplifier 96 may be used to drive a conventional communications loop relay.

The stop clamp 114, which couples the phase inverter 106 to the bistable multivibrator 94, acts as a mark enforcer to insure that the bistable multivibrator 94 is always in a mark condition if the input communications loop is in a mark position. If the regenerative repeater 20 remains in a steady space condition, its output will be in a steady space condition because the space gate 100 will have passed at least one signal (since a previous mark-to-space transition has caused a series of sampling pulses). If the communications loop now goes to a steady mark condition, no sampling pulses are generated because only a mark-to-space transition initiates a sampling cycle. Under these conditions the mark signal fed from the input unit 22 via the line 36 and the stop clamp 114 forces the bistable multivibrator 94 to a mark condition. When, however, the sampling pulses are generated, a signal via the line 116 from threshold trigger 90 of timing unit 28 (Fig. 5) (waveforms G or P, Fig. 8) disables the clamp and it has no effect in the circuit.

The schematic diagram of input unit 22 is shown in Fig. 9. The input loop is coupled to loop oscillator 50. Mark current in the input loop will develop a voltage across resistor 122. This voltage is applied to the transistor 120 through the windings of transformer 52 which supplies the required feedback in the circuit to produce oscillations. The frequency of oscillation is in the neighborhood of 10,000 cycles per second.

The output from transformer 52 across winding 52A is applied to diode 124 which rectifies the audio signal. Capacitor 126 filters the rectified output of the diode 124. The rectified and filtered signal is applied to potentiometer 128 which sets the input level to vacuum tube 130 of threshold trigger 56 for keying at the half-current points of the input loop.

Threshold trigger 56 is a Schmitt trigger circuit which includes vacuum tube 130 having cathodes joined at point 130C coupled through resistor 132 to ground to provide a positive feedback so that the circuit triggers rapidly in one direction at a certain input potential and back in the other direction at a slightly lower input potential. A rectangular waveform output is transmitted from the plate 130B of this tube even though the input waveform may be misshapen.

The output from threshold trigger 56 is applied via resistor 136 and filter level control potentiometer 138 to filter 58, which comprises the resistor 58A and the capacitors 58B (1—3). Depending on the repetition rate of the signals being handled, capacitance 58B is changed so that the shaping is uniform for any speed used. Potentiometer 138, the filter level control, is set in practice so that the level of input to the vacuum tube 140 of threshold trigger 60 is such that the output from threshold trigger 60 shows no bias distortion when the output from the threshold trigger 56 has no bias distortion. Threshold trigger 60 is also a Schmitt trigger circuit similar to that of threshold trigger 56.

The filtering due to the integrating effect of filter 58 eliminates spikes or short transients in the signal appearing at the input of loop oscillator 50. This is an important function since in radio circuits the signal may have a hole or a drop-out at the time of sampling and would produce an error. However, by means of the filter 58 these drop-outs are removed. The reliability of the regenerative repeater 20 when the communications loop includes radio circuits is accordingly improved. The filtered and reshaped information signals are transmitted from the anode 140A of vacuum tube 140 to line 31.

The sensing and switching unit 24 is shown in Fig. 10. When the regenerative repeater 20 is set for five-unit code signals and it is desired to transmit eight-unit code, the special character for eight-unit code is transmitted and is sensed by gate 62. This character has a space in the seventh position. Thus, if the regenerative repeater 20 is on five-unit code so that the character gate signal of line 40A is as waveform G of Fig. 8, the off-going transition of this waveform coincides with the stop mark or the seventh position of the five-unit code.

More particularly, the output of input unit 22 is fed via line 32 and resistor 150 to the anode of diode 152 of gate 62 while the transition gate signal from timing unit 28 at the end of the five-unit character is fed via line 40A and capacitor 156 to diode 152. There is, therefore, a coincidence of the pulse occurring at the on-to-off transition on line 40A with a space or positive signal on line 32 from input unit 22 (waveform F', Fig. 8). The coincidence permits the pulse to be passed from the anode to the cathode of diode 152. However, if the output at this time from input unit 22 is a mark, a negative signal (waveform F, Fig. 8) is fed via line 32 to the anode of the diode 152 when the pulse from line 40A passes through capacitor 156 and this pulse will not pass through the diode 152.

Gate 62, therefore, acts as a gate to pass a pulse at the time of the occurrence of the seventh position, only if there is a space condition existing at this time. As long as five-unit code signals are being received, the seventh position will always occur at the stop-mark and no pulse will be applied from the anode to cathode of diode 152. However, with any eight-unit code character which has a space in the seventh position, the pulse formed by the on-to-off transition on line 40A will be passed through capacitor 156 to the anode of diode 152 which is now positive, and appears at the cathode of diode 152 to trigger monostable multivibrator 66.

When monostable multivibrator 66 is triggered, a pulse is applied from anode 158A of vacuum tube 158, through capacitor 160 and resistor 162 to the anode 164A of vacuum tube 164 in bistable multivibrator 64. The pulse from vacuum tube 158 applied to anode 164A of vacuum tube 164 will be a negative pulse since anode 158A is positive in the static condition. This negative pulse, in addition to being applied to the anode 164A of vacuum tube 164, is also applied through resistor 166 and capacitor 168 to the grid 170C of vacuum tube 170. Thus, the anode 170A will go positive and stay in a locked positive condition after the application of the negative pulse to the grid 170C.

When anode 170A goes positive, this positive-going voltage is applied via resistors 172 to line 42.

When it is desired to reset the regenerative repeater 20 for five-unit code operation, a blank special character is transmitted via the input loop to actually trigger the sensing and switching unit 24 to the condition of five-unit code operation. It will be recalled that the blank special character in the five-unit code has five spaces following the starting space, making a total of six spaces. Inasmuch as the output of input unit 22 is positive on space, at the start of the start space a positive voltage is fed via line 32 to resistor 68B which cooperates in integrator 68 with capacitors 68A (1—3).

Waveform H of Figure 8 illustrates how the voltage will charge capacitors 68A during the reception of the blank character. The voltage gradually increases until at the center of the sixth position, a voltage of sufficient amplitude is applied to cause threshold trigger 70 to operate. In practice, potentiometer 174, the blank control, is adjusted so that threshold trigger 70 operates at the exact center of the sixth position.

At the end of the five-unit character gate, a positive pulse is fed from timing unit 28 via line 40B and resistor 176 to the grid of vacuum tube 74B. This positive pulse at the grid causes the anode of vacuum tube 74B to go negative. The negative voltage is applied through clamp tube 74A to discharge capacitors 68A (1—3). The action of discharging the capacitors 68 (1—3) causes the integrator 68 to start from the same initial reference level. This insures the reliability of the circuit, since the circuit is reset at the end of every character and starts out at the same voltage level at the beginning of every character.

Threshold trigger 70 turns off at the start of the discharge. Thus, a positive pulse is transmitted from the anode 178A of vacuum tube 178. The positive rise of voltage from the anode 178A is differentiated by capacitor 180 and applied to grid of vacuum tube 182, causing a negative pulse to appear at the anode of vacuum tube 182. The negative pulse is applied directly to the anode 170A and through capacitor 184 to the grid 164C of vacuum tube 164. Bistable multivibrator 64 changes stable states so that the anode 170A is negative and the anode 164A is positive. The negative signal is fed via resistor 172 to line 42.

The timing unit 28 as shown in Fig. 11 may be divided into two parts. First, there is a character gate timing circuit which supplies a signal approximately the length of the character and is used to gate on and off a pulse generator. The pulse generator, the second part, operates at such a frequency that pulses may be obtained which occur at the exact center of each of the Bauds or positions of each of the incoming characters. These so-called sampling pulses are used in the regeneration of the signal.

Gate 80 is used to allow only positive pulses from the input unit 22 via line 34 to be fed to the monostable multivibrator 82. Capacitor 200 and resistor 202 differentiate the signals from line 34. The first positive pulse resulting from a mark-space transition on the line 34 is applied through gate 80 to the grid 206C of vacuum tube 206 of monostable multivibrator 82. Monostable multivibrator 82 is a cathode coupled one-shot monostable circuit whose timing is determined primarily by the values of resistors 208 and 210, potentiometers 212 to 214, and the capacitor 216. These various RC circuits provide the time constants required for different information signal repetition rates. Since negative pulses differentiated by capacitor 200 and resistor 202 might turn off monostable multivibrator 82, they are eliminated by the action of gate 80 which is biased so that only positive pulses are passed. Monostable multivibrator 82 is on for six and one half Baud lengths or information positions.

The output from the anode of vacuum tube 218 is applied via resistor 88A of adder 88 to the grid 220C of vacuum tube 220 in threshold trigger 90.

Threshold trigger 90 is a Schmitt trigger circuit similar in operation to the threshold triggers 56 and 60 in the input unit 22. The output signal of threshold trigger 90 is similar on five-unit code operation to the output signal of monostable multivibrator 82 (waveform G, Fig. 8).

During five-unit code operation, gate 84 will not transmit a pulse from the output of monostable multivibrator 82 to monostable multivibrator 86 which is therefore not activated during five-unit code operation. During eight-unit code operation, however, gate 84 does transmit a pulse at the on-to-off transition of monostable multivibrator 82.

The operation of gate 84 is dependent on the polarity of the voltage on line 42 from sensing and switching unit 24.

When a negative voltage on line 42 is fed via resistors 228 and 230 to the grid 222C, vacuum tube 222 is unable to pass a pulse from the output of monostable multivibrator 82 to the input of monostable multivibrator 86.

A positive potential on line 42 during regeneration of eight-unit code causes the grid 222C of vacuum tube 220 to become positive. When the grid 222C is positive, a negative pulse received via capacitor 224 from vacuum tube 218 causes a positive pulse to be transmitted from the anode of vacuum tube 222. This pulse is coupled via capacitor 226 to grid 240C of monastable multivibrator 86.

When a pulse is transmitted by gate 84 it triggers monostable multivibrator 86. The timing of monostable multivibrator 86 is again determined primarily by the resistance and capacitance network comprising capacitor 230, resistor 232, and the potentiometers 234 to 236 coupled to grid 241C. Monostable multivibrator 86 is a cathode coupled monostable circuit, identical in circuit configuration to monostable multivibrator 82 except for the value of the time constants.

During the eight-unit code operation, it is possible for pulses on line 34 to retrigger monostable multivibrator 82 while monostable multivibrator 86 is operating. To prevent such a possibility the output from anode 240A of vacuum tube 240 of monostable multivibrator 86 is applied via resistor 242 and 202 back to the grid of the vacuum tube of gate 80. Thus, while monostable multivibrator 86 is on, the anode 240A is negative and gate 80 is prevented from conducting any signal whatsoever.

The output from the anode 241A of monostable multivibrator 86 is fed via resistor 88B of adder 88 to the grid 220C of vacuum tube 220 in the threshold trigger 90. It should be noted that the output from the anode 218C of vacuum tube 218 in monostable multivibrator 82 is also applied to the grid 220C via resistor 88A of adder 88.

The output of threshold trigger 90 is taken from anode 221A of vacuum tube 221.

The pulse generator is an astable multivibrator 92 which is a balanced multivibrator circuit. It includes vacuum tubes 252 and 254. Under static conditions when no information signals are being received, the anode 221A of threshold trigger 90 is at a low potential and accordingly feeds a low voltage via resistor 250 to the grid 252C of vacuum tube 252 causing it to be more negative than the grid 254C of vacuum tube 254.

Therefore, astable multivibrator 92 is not oscillating, as the voltage developed at the cathodes by the cathode resistor 256 will allow the tube 252 to be effectively cut off, while the tube 254 is conducting.

When threshold trigger 90 is activated so that the anode 221A of vacuum tube 221 goes positive, vacuum tubes 252 and 254 operate like a symmetrical multivibrator. The potential applied to resistor 250 is at full V+ potential, the vacuum tube 221 being cut-off, and all the resistors and capacitors in the circuit of astable multivibrator 92 are balanced, so that it will oscillate as a balanced multivibrator.

The frequency of oscillation of astable multivibrator 92 is determined primarily by the grid and anode resistors 92 and the value of capacitors 260 to 265. Additionally, a speed balance control is provided so that the output waveform is completely symmetrical.

Fig. 12 shows the gating and output unit 30 wherein the information signals are actually regenerated. The pulses from astable multivibrator 92 via line 38 are applied to the grid 260C of vacuum tube 260 in space gate 100 after differentiation by capacitor 104. The information signals from input unit 22 via line 36 are also applied to the grid 260C via resistor 262 to form a combined signal.

Phase inverter 106 is used to reverse the phase of the information signals so that the signals applied via resistor 266 to the grid 264C of vacuum tube 264 are transmitted to mark gate 98 inverted with respect to the information signals fed to space gate 100. The grid potentials of vacuum tubes 264 and 260 are chosen so that in operation these tubes will conduct signals only above predetermined levels, as shown in waveforms S and T of Fig. 8.

Signals on the grid 260C of vacuum tube 260 in space gate 100, which exceed the conduction level, are transmitted from the cathode 260B to drive the grid 270C of the vacuum tube 270 in bistable multivibrator 94. The vacuum tube 270 conducts and is at a low potential while the anode 271A of vacuum tube 271 is at a high potential. On the other hand, when the signal on grid 268C of vacuum tube 268 in mark gate 98 exceeds the conduction level, grid 271C of vacuum tube 271 receives a pulse from the cathode 268B of vacuum tube 268 causing anode 271A to drop in potential and anode 270A to rise in potential. This action continues throughout each character.

Stop clamp 114 performs the function of allowing the output of regenerative repeater 20 to be in the same state as its input. If the regenerative repeater 20 is started in operation by a legitimate start pulse, which provides a mark to space transition, such start pulse causes the generation of the character gates and the sampling pulses for sampling the input signal and provide an output accordingly. If the input goes from mark to space the output would follow accordingly since space input would be sampled. However, if the regenerative repeater 20, which is now on steady space, returns to mark, the monostable multivibrator 82 and the astable multivibrator 92 are not activated, and there are no sampling pulses generated, so that the output would now not return to mark. Stop clamp 114 allows a mark return.

The potential at the anode 264A of vacuum tube 264 in phase inverter 106 is positive on mark and is fed via resistor 282 to the grid 280C of vacuum tube 289 in stop clamp 114. The potential of line 116 is also positive and this potential is applied via resistor 284 to the grid 280C. Thus, when two positive voltages are applied from both resistors 282 and 284 to the grid 280C, the anode 280A is at a low potential. Anode 280A is connected to anode 271A of vacuum tube 271 forcing astable multivibrator 94 to the mark condition. During normal operation, the potential on line 116 is low causing tube 280 to remain in a cut-off condition. Thus, during normal operation, stop clamp 116 has no effect on bistable multivibrator 94. Bistable multivibrator 94 is coupled to output amplifier 96 which drives relay K1.

The input to the grids of each vacuum tubes 290 and 292 is direct from the anodes of vacuum tubes 270 and 271 so that vacuum tubes 290 and 292 act as a direct coupled push-pull amplifier to drive the relay coils 296 and 298 of relay K1. An output distortion adjust control potentiometer 299 permits adjustment of the currents drawn by the vacuum tubes 290 and 292 so that essentially zero bias output is secured from the contacts of relay K1.

In operation, vacuum tube 292 draws current on mark and vacuum tube 290 draws current on space. Excitation of the coil causes a closure of the relay contacts K1A and K1B to make the marking condition. Resistor 300 and capacitor 302 provide arc suppression to lengthen the life of the contacts. Capacitors 304 and 306 are used for interference suppression so that the residual contact arcing does not radiate extensively. Resistor 308 in series with the contacts of the relay provides some suppression of radiation. If a battery is connected directly across the output contacts, this resistor will be in series with the battery and therefore will prevent destruction of the contacts of the relay K1.

It should be noted that all the switches which control the selection of the various time constants are preferably ganged to facilitate adjusting the circuits of the regenerative repeater 20 to the repetition rate of the information signals.

These has thus been shown improved regenerative repeater apparatus which may be employed in a communications loop over which information is transmitted in different code systems. More particularly, the apparatus can regenerate information represented in either one of two different codes such as standard teletype code which uses five-unit code or in data processing code which employs eight-unit code.

While only two embodiments of the invention have been shown and described in detail, there will now be obvious to those skilled in the art many modifications and variations which accomplish the objects and realize many or all of the advantages while not departing from the spirit of the invention as defined in the appended claims.

What is claimed is:

1. In a communications loop which transfers information signals wherein a unit of information is represented by a coded combination group of a first number of signals or a coded combination group of a second number of signals, a repeater comprising sensing means for sensing whether the units of information being transferred are represented by coded combination groups of said first or second number of signals, and regenerating means responsive to said sensing means and the information signals for transmitting regenerated information signals in groups of said first or said second numbers of signals in accordance with the coded combination groups sensed by said sensing means.

2. In a communication loop which transfers information as information signals wherein a unit of information is represented by a coded combination group of a first number of signals or a coded combination group of a second number of signals, a repeater comprising a sensing means for sensing whether the units of information being transferred are represented by coded combination groups of said first or said second numbers of signals, sampling pulse generating means responsive to said sensing means for generating a group of a first or a second number of sampling pulses for each unit of information in accordance with the coded combination groups sensed by said sensing means, and gating means responsive to said groups of sampling pulses and said information signals to transmit regenerated information signals.

3. In a communications loop which transfers information as information signals wherein a unit of information is represented by a coded combination group of a first number of signals or a coded combination group of a second number of signals, a repeater comprising an input means for receiving the information signals, a sensing means for sensing whether the units of information being received are represented by groups of said first or said second number of signals, first regenerating means for transmitting regenerated information signals in groups of said first number of signals, second regenerating means for transmitting information signals in groups of said second number of signals, and means associated with said sensing means for selectively coupling said first or said second regenerating means to said input means.

4. In a communications loop which transfers information as information signals wherein a unit of information is represented by a coded combination group of a first number of signals or a coded combination group of a second number of signals, a repeater comprising an input means for receiving information signals, an output means for transmitting signals, a sensing means responsive to said input means for sensing whether the units of information being received are represented by groups of said first or said second number of signals, a first regenerating means for transmitting regenerated information signals upon receipt of information signals from said input means, said first regenerating means including a sampling pulse generating means for generating a first number of sampling pulses for each unit of information received by said first regenerating means and a gating means responsive to said sampling pulses and the information signals received by said first regenerating means to transmit regenerated information signals, second regenerating means for transmitting regenerated information signals upon receipt of information signals from said input means, said second regenerating means including a sampling pulse generating means for generating a second number of sampling pulses for each character of information received by said second regenerating means and gating means responsive to the sampling pulses and the information signals received by said second regenerating means to transmit regenerated information signals, and means responsive to said sensing means for selectively coupling said input means to said output means via said first or said second regenerating means.

5. In a communication link which transfers information as information signals wherein a unit of information is represented by a coded combination group of a first number of signals or a coded combination group of a second number of signals, a repeater comprising an input means for receiving information signals, a sensing means responsive to said input means for sensing whether the units of information being received are represented by groups of said first or said second number of signals, a first sampling pulse generating means for generating a group of a first number of sampling pulses for each unit of information received, a second sampling pulse generating means for generating a group of a second number of sampling pulses for each unit of information received, said sensing means selectively activating said first or said second sampling pulse generating means, and a gating means responsive to said first and second sampling pulse generating means and said input means for transmitting regenerated information signals.

6. In a communication loop which transfers information as information signals wherein a unit of information is represented by a coded combination group of a first number of signals or a coded combination group of a second number of signals, a repeater comprising an input means for receiving information signals, a sensing means responsive to said input means for sensing whether the units of information being received are represented by groups of said first or said second number of signals, a first sampling pulse generating means for generating a group of a first number of sampling pulses for each unit of information received, a second sampling pulse generating means for generating a second group of sampling pulses for each unit of information received, and a gating means responsive to said input means and selectively responsive to said first or said second sampling pulse generating means under the control of said sensing means to transmit regenerated information signals.

7. In a communication loop which transfers information as information signals wherein a unit of information is represented by a coded combination group of a first number of signals or a coded combination group of a second number of signals, said information signals being transmitted at different repetition rates, a repeater comprising a sensing means for sensing whether the units of information being transferred are represented by coded combination groups of said first or said second numbers of signals, sampling pulse generating means responsive to said sensing means for generating a group of a first or a second number of sampling pulses for each unit of information in accordance with the coded combination groups sensed by said sensing means, means for adjusting the pulse repetition rate of said sampling pulses in accordance with the repetition rate of said information signals, and gating means responsive to said groups of sampling pulses and said information signals to transmit regenerated information signals.

8. In a communication loop which transfers information as information signals wherein a unit of information is represented by a coded combination group of a first number of signals or a coded combination group of a second number of signals, and wherein said information signals are transmittable at different repetition rates, a repeater comprising an input means for receiving information signals, a sensing means responsive to said input means for sensing whether the units of information being received are represented by groups of said first or said second number of signals, a first sampling pulse generating means for generating a group of a first number of sampling pulses for each unit of information received, means for controlling the pulse repetition rate of said group of said sampling pulses in accordance with the repetition rate of the information signals, a second sampling pulse generating means for generating a second group of sampling pulses for each unit of information received, means for controlling the pulse repetition rate of said group of said sampling pulses in accordance with the repetition rate of the information signals, and a gating means responsive to said input means and selectively responsive to said first or said second sampling pulse generating means under the control of said sensing means to transmit regenerated information signals.

9. In a communication loop which transfers information as information signals wherein a unit of information is represented by a coded combination group of a first number of signals or a coded combination group of a second number of signals, a repeater comprising an input means for receiving information signals, a sensing means responsive to said input means for sensing whether the units of information being received are represented by groups of said first or said second number of signals, a first sampling signal generating means for generating a first plurality of sampling signals for each unit of information received, said first plurality of sampling signal being equal to said first number, a second sampling signal generating means responsive to said first signal generating means for generating a second plurality of sampling signals at the termination of said first plurality, the number of signals in said secondary plurality being equal to the difference between said first and second numbers, said sensing means controlling the activation of said second sampling signal generating means, and a regenerative gating means responsive to said first and second sampling generating means and said input means for transmitting regenerated information signals.

10. In a communication loop which transfers information as information signals wherein a unit of information is represented by a coded combination group of a first number of signals or a coded combination group of a second number of signals, and wherein said information signals are transmittable at different repetition rates, a repeater comprising an input means for receiving information signals, a sensing means responsive to said input means for sensing whether the units of information being received are represented by groups of said first or said second numbers of signals, a first sampling signal generating means for generating a first plurality of sampling signals for each unit of information received, said first plurality of sampling signals being equal to said first number, means for controlling the pulse repetition rate of said first plurality of sampling signals in accordance with the repetition rate of said information signals, a second sampling signal generating means responsive to said first signal generating means for generating a second plurality of sampling signals at the termination of said first plurality, the number of signals in said second plurality being equal to the difference between said first and second numbers, means for controlling the pulse repetition rate of said second plurality of sampling signals in accordance with the repetition rate of said information signals, said sensing means controlling the activation of said second sampling signal generating means, and a regenerative gating means responsive to said first and second sampling signal generating means and said input means for transmitting regenerated information signals.

11. In a communications loop which transfers information as information signals wherein a unit of information is represented by a coded combination group of a second number of signals, a repeater comprising an input means for receiving information signals, a sensing means responsive to said input means for sensing whether the units of information being received are represented by groups of said first or said second numbers of signals, a pulse generator for generating sampling pulses, a first control means responsive to said input means for causing said pulse generator to generate a plurality of sampling pulses equal to said first number, a second control means responsive to said first control means for causing said pulse generator to generate a second plurality of sampling pulses following said first plurality, said sensing means controlling the activation of said second control means, and a regenerative gating means responsive to said input means and said pulse generator for transmitting regenerated information signals.

12. In a communications loop which transfers information as information signals wherein a unit of information is represented by a coded combination group of a first number of signals or as a coded combination group of a second number of signals, said information signals being transmittable at different repetition rates, a repeater comprising an input means for receiving information signals, a sensing means responsive to said input means for sensing whether the units of information being received are repersented by groups of said first or said second numbers of signals, a pulse generator for generating sampling pulses, means for controlling the pulse repetition rate of said sampling pulses in accordance with the repetition rate of said information signals, a first control means responsive to said input means for causing said pulse generator to generate a plurality of sampling pulses equal to said first number, a second control means responsive to said first control means for causing said pulse generator to generate a second plurality of sampling pulses following said first plurality, said sensing means controlling the activation of said second control means, and a regenerative gating means responsive to said input means and said pulse generator for transmitting regenerated information signals.

13. In a communications loop which transfers information as information signals wherein a unit of information is represented by a coded combination group of a first number of signals or as a coded combination group of a second number of signals, a repeater comprising an input means for receiving information signals, a sensing means responsive to said input means for sensing whether the units of information being received are represented by groups of said first or said second numbers of signals, a first monostable multivibrator responsive to said input means for generating a first control signal having a duration substantially equal to the duration of said first number of signals, a gating means responsive to said first monostable multivibrator for transmitting a signal at the termination of said first control signal, said sensing means controlling the transmission of signals by said gating means, a second monostable multivibrator responsive to said gating means for generating a second control signal having a duration substantially equal to the difference in time between the duration of said first and second numbers of signals, a pulse generator responsive to said first and second monostable multivibrators for generating sampling pulse signals, said sampling pulse signals each having a pulse repetition rate equal to the repetition rate of said information signals, and a regenerative gating means responsive to said input means and said pulse generator for transmitting regenerated information signals.

14. The apparatus of claim 13 including a second gating means interposed between said input means and said first monostable multivibrator, said second gating means being responsive to said second monostable multivibrator to prevent transmission of signals to said first monostable multivibrator while said second control signal is present.

15. In a communication loop which transfers information signals in first or second blocks of units of information wherein said first blocks are prefixed by a unit of information having a first predetermined combination of a first number of signals, and the units of information of said first block are represented by coded combination groups of said first number of signals, and said second blocks are prefixed by a unit of information having a second predetermined combination of a second number of signals and the units of information of said second block are represented by coded combination groups of said second number of signals, a repeater comprising an input means for receiving the blocks of information signals, a first sensing element responsive to said input means for sensing for said first predetermined combination of said first number of signals, a second sensing element responsive to said input means for sensing for said second predetermined combination of said second number of signals, a bistable switching means responsive to said first and second sensing elements, and means responsive to said input means and said bistable switching means to transmit coded combination of said first or said second number of signals in accordance with the state of said bistable switching means.

16. In a communication loop which transfers information as information signals in first or second blocks of units of information wherein said first blocks are prefixed by a unit of information having a first predetermined combination of a first number of signals and the units of information of said first blocks are represented by coded combination groups of said first number of signals, and said second blocks are prefixed by a unit of information having a second combination of a second number of signals and the units of information of said second blocks are represented by coded combination groups of said second number of signals, a repeater comprising an input means, a bistable switching means, a first sensing element responsive to said input means to sense for said first predetermined combination of said first number of signals for setting said bistable switching means to a first stable state, a second sensing element responsive to said input means to sense for said second predetermined combination of said second number of signals for setting said bistable switching means to a second stable state, timing means responsive to said input means for controlling the sensing by said first and second sensing elements to predetermined times during the reception of each of the units of information, and means responsive to said input means and said bistable switching means for transmitting coded combination groups of said first and second number of signals in accordance with the state of said bistable switching means.

17. In a communication loop which transfers information as information signals in first or second blocks of units of information wherein said first blocks are prefixed by a unit of information having a first predetermined combination of a first number of signals wherein the units of information of said first blocks are represented by a coded combination group of said first number of signals, and wherein said second blocks are prefixed by a predetermined combination of a second number of signals and the units of information of said second block are represented by coded combination groups of said second number of signals, a repeater comprising an input means, a bistable multivibrator, a first gating means for transferring a signal from said input means to said bistable multivibrator when said first predetermined combination of said first number of signals are received by said input means for causing said bistable multivibrator to assume a first stable state, an integrating means responsive to said input means of said integrating means for causing said bistable multivibrator to assume a second stable state when said second predetermined combination of said second number of signals are received by said input means, timing means for controlling the operation of said first gating means and said integrating means, and regeneration means responsive to said bistable multivibrator for transmitting coded combinations of said first and second numbers of signals in accordance with the state of said bistable switching means.

18. In a communication loop which transfers information as information signals in first or second blocks of units of information wherein said first blocks are prefixed by a unit of information having a first predetermined combination of a first number of signals and the units of information of said first blocks are represented by coded combination groups of said first number of signals, and said second blocks are prefixed by a predetermined combination of a second number of signals, and wherein the units of information of said second blocks are represented by coded combination groups of said second number of signals, a repeater comprising an input means, a bistable multivibrator, a first gating means for transferring a signal from said input means to said bistable multivibrator when said first predetermined combination of said first number of signals is received by said input means for causing said bistable multivibrator to assume a first stable state, an integrating means responsive to said input means, said integrating means causing said bistable multivibrator to assume a second stable state when said second predetermined combination of said second number of signals is received by said input means, a first monostable multivibrator responsive to said input means for generating a first control signal of said first gating means and said integrating means, the period of said first monostable multivibrator having a duration substantially equal to the duration of said first number of signals, said first monostable multivibrator controlling the operation of said first gating means and said integrating means, a second gating means responsive to said first monostable multivibrator for transmitting a signal at the termination of said first control signal, said bistable multivibrator controlling the transmission of signals by said second gating means, a second monostable multivibrator responsive to said second gating means for generating a second control signal, the period of said second monostable multivibrator having a duration substantially equal to the difference in time between the duration of said first and second numbers of signals, a pulse generator responsive to said first and second monostable multivibrators for generating sampling pulse signals, said sampling pulse signals each having a pulse repetition rate equal to the repetition rate of said information signals, and a regenerative gating means responsive to said input means and said pulse generator for transmitting regenerated information signals.

19. The apparatus of claim 18 including a third gating means interposed between said input means and said first monostable multivibrator, said third gating means being responsive to said second monostable multivibrator to prevent transmission of signals to said first monostable multivibrator while said second control signal is present.

20. The apparatus of claim 18 including means for controlling the duration of said first and second control signals and the pulse repetition rate of said sampling pulses in accordance with the rate of transmission of said information signals.

21. In a communications system for transferring chosen groups of information signals selectively coded in any of a plurality of codes, a repeater comprising sensing means for sensing which code said groups are coded in, and regenerating means responsive to said sensing means and said signals for transmitting regenerated signals corresponding to said selectively coded signals.

22. In a communications system for transferring information signals selectively according to at least two of a plurality of codes, a repeater comprising sensing means for sensing whether said signals are being transferred according to a first or a second of said codes, and regenerating means responsive to said sensing means and said signals for transmitting regenerated signals in accordance with said information signals.

No references cited.